United States Patent [19]

Lewalter et al.

[11] 4,269,750

[45] May 26, 1981

[54] PROCESS FOR THE PREPARATION OF POLYMERS CONTAINING HYDANTOIN GROUPS

[75] Inventors: Jürgen Lewalter; Ludwig Rottmaier, both of Odenthal; Rudolf Merten, Leverkusen; Wilfried Zecher, Leverkusen; Willi Dünwald, Leverkusen; Bernhard Schulte, Krefeld, all of Fed. Rep. of Germany

[73] Assignee: Bayer Aktiengesellschaft, Leverkusen, Fed. Rep. of Germany

[21] Appl. No.: 100,419

[22] Filed: Dec. 5, 1979

[30] Foreign Application Priority Data

Dec. 16, 1978 [DE]  Fed. Rep. of Germany ....... 2854442

[51] Int. Cl.³ ............................................. C08G 18/00
[52] U.S. Cl. ............................. 260/30.2; 260/30.4 N; 260/30.8 DS; 260/31.2 N; 260/31.4 R; 260/32.2; 260/32.6 N; 260/32.8 N; 260/33.2 R; 260/33.4 R; 260/33.6 R; 260/33.8 R; 528/48; 528/49; 528/52; 528/73; 528/74; 528/75; 528/84

[58] Field of Search ...................... 528/48, 49, 52, 73, 528/74, 75, 84; 260/30.4 N, 30.8 DS, 31.2 N, 32.2, 31.4 R, 30.2, 32.6 N, 32.8 N, 33.2 R, 33.4 R, 33.6 R, 33.8 R

[56] References Cited

U.S. PATENT DOCUMENTS

| | | | |
|---|---|---|---|
| 3,397,253 | 8/1968 | Merten et al. | 260/309.5 |
| 3,549,599 | 12/1970 | Merten | 260/33.4 R |
| 3,639,418 | 2/1972 | Merten | 260/309.5 |
| 3,642,524 | 2/1972 | Merten et al. | 260/33.4 P |
| 3,684,774 | 8/1972 | Merten et al. | 260/309.5 |
| 3,705,874 | 12/1972 | Merten et al. | 260/30.8 DS |

*Primary Examiner*—Maurice J. Welsh
*Attorney, Agent, or Firm*—Connolly and Hutz

[57] ABSTRACT

A process for the production of compounds containing hydantoin groups by reacting α-amino-carboxylic acid derivatives and organic isocyanates in the presence of acid groups and either in absence of any solvent or in the presence of a non-phenolic solvent.

11 Claims, No Drawings

PROCESS FOR THE PREPARATION OF POLYMERS CONTAINING HYDANTOIN GROUPS

This invention relates to a process for the preparation of compounds containing hydantoin groups by the reaction of polyfunctional α-aminocarboxylic acid derivatives and organic isocyanates in the presence of acid groups.

Processes for the preparation of polyhydantoin materials by the reaction of glycine ester derivatives and polyisocyanates are known, for example as disclosed in U.S. Pat. No. 3,397,253 (BE 678 282).

This process has subsequently been the subject of numerous variations in which these polyhydantoins are varied by the addition or incorporation of other functional groups such as amide, imide or ester groups. groups such as amide, imide or ester groups. Numerous different solvents are recommended for these variations of the process.

Polyhydantoins or hydantoin group containing polymers which have the desired and necessary high qualitites have hitherto been produced exclusively in phenolic solvents such as phenol, cresols or xylenols or mixtures thereof.

Since these phenolic solvents, which are evidently necessary for optimum hydantoin ring synthesis, cause severe pollution of the environment, it is necessary to use very elaborate recovery plants to effect as far as possible their complete removal from effluent and air.

It has now been found that high quality polyhydantoins or compounds containing hydantoin rings having excellent properties satisfying commercial requirements can also be obtained from monofunctional or polyfunctional α-aminocarboxylic acid derivatives and organic isocyanates in any, preferably non-phenolic solvents or solvent-free systems by mixing the reactants in the presence of acid groups, preferably carboxyl groups, and condensing them at a temperature in the range of from −10° C. to 500° C., preferably from 20° to 400° C.

The course of the reaction is surprising since it is particularly the reaction of hydantoin formation from α-aminocarboxylic acid derivatives and organic isocyanates which could hitherto only be carried out with an optimum hydantoin ring formation in solvents containing phenolic hydroxyl groups whereas the formation in solvents which are free from phenolic groups resulted in minor quantities of hydantoin ring system and the preferential formation of complicated, partly cross-linked mixtures of substances.

The polymers prepared in this manner can be worked up directly into adhesives, powders, foils or synthetic materials, optionally after the addition of other environmentally harmless, nonphenolic solvents.

The α-aminocarboxylic acid derivatives used for the process according to the present invention are preferably polyfunctional and most preferably difunctional compounds of the type corresponding to the following general formula (I):

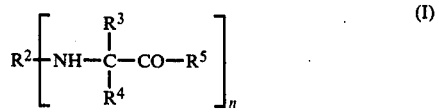

wherein $R^2$ represents an alkyl group having from 2 to 20 carbon atoms optionally substituted with halogen atoms with at least one $C_1$–$C_{10}$ alkyl group and/or at least one $C_6$–$C_{12}$ aryl group; an aryl group having from 5 to 12 carbon atoms, a cycloalkyl group having from 5 to 12 carbon atoms, an alkyl-aryl group having from 6 to 20 carbon atoms or an aryl or cycloalkyl group having from 5 to 12 ring carbon atoms and containing one or more hetero atoms such as N or O or S in the ring; $R^3$ and $R^4$, the same or different, represent hydrogen, an alkyl group having from 1 to 20 carbon atoms, an aryl group having from 5 to 12 carbon atoms or an aralkyl group having from 6 to 20 carbon atoms or may be linked in an alkyl ring with $C_2$–$C_{20}$; $R_5$ represents a hydroxyalkyl group, an amino group, a $C_1$–$C_{20}$ alkylamino group, a $C_1$–$C_{20}$ dialkylamino group, a $C_1$–$C_{20}$ alkoxy group or a $C_5$–$C_{12}$ aroxy group and n represents an integer of from 2 to 4, preferably 2. These glycine ester compounds are known from U.S. Pat. No. 3,397,253.

$R^2$ preferably represents an aromatic group, with $C_6$–$C_{12}$ and is particularly derived from benzene, naphthalene, anthracene, diphenyl, triphenyl methane, diphenylmethane and diphenylethers. These groups may also carry one or more substituents, for example, $C_1$–$C_{20}$ alkyl groups (methyl), halogen atoms (chlorine) nitro groups, $C_1$–$C_{20}$ alkoxy groups (methoxy), $C_1$–$C_{20}$ dialkylamino groups (dimethylamino), acyl groups (acetyl), $C_2$–$C_{17}$ carbalkoxy groups (carbomethoxy or carbethoxy) and cyano groups. The benzene, naphthalene, diphenylmethane and diphenylether groups optionally substituted once or twice with methyl and/or chlorine or once or twice with carboxyl groups are preferred.

The groups $R^3$ and $R^4$ may also be linked together as members of a cyclic $C_2$–$C_{20}$ alkyl group and they may be substituted by one or more halogen atoms (chlorine, bromine), or more cyano, hydroxycarbonyl, aminocarbonyl alkoxycarbonyl or aroxycarbonyl groups.

The preparation of the α-aminocarboxylic acid derivatives which are to be used as starting compounds according to the present invention is known in principle and may be carried out by, for example, the reaction of aromatic amines or aminocarboxylic acids with haloacetic acid or derivatives thereof or by condensation with hydrocyanic acid and aldehydes or ketones followed by conversion of the nitrile group, for example into carboxylic acid, ester or amide.

The acid groups are preferably introduced into the reaction mixture in the form of compounds having at least one carboxyl group in the molecule. Particularly high quality hydantoin compounds are obtained when the compound containing carboxyl groups is at least bifunctional, i.e. if in addition to the carboxyl groups it carries at least one further functional group, e.g. a carboxylic, carboxylic acid ester, cyclic anhydride, hydroxyl, amino or glycine acid derivative group. It is preferred to use compounds corresponding to the following general formula (II):

wherein $R^1$ represents a $z+1$ valent, substituted or unsubstituted aliphatic group having preferably from 1 to 20 carbon atoms, cycloaliphatic group having preferably from 5 to 12 carbon atoms, aliphatic-aromatic group having preferably from 6 to 20 carbon atoms or aromatic group having preferably from 5 to 12 carbon atoms or an aryl or cycloalkyl group having from 5 to 12 ring carbon atoms and containing heteroatoms such as N or O or S in the ring, z represents an integer of from 1 to 4, preferably 1 or 2, and X represents a carboxylic, glycine acid derivative, hydroxyl, amino, carboxylic acid ester or cyclic anhydride group.

The acid coreactants used are therefore preferably polycarboxylic acids, particularly dicarboxylic acids.

The following are examples of such polycarboxylic acids: oxalic acid, malonic acid, succinic acid, glutaric acid, adipic acid, trimethyladipic acid, fumaric acid, maleic acid, hexahydroterephthalic acid, phthalic acid, isophthalic acid, terephthalic acid, benzene-1,3,5-tricarboxylic acid, benzene-1,2,4-tricarboxylic acid, benzene-1,2,3-tricarboxylic acid, naphthalene-1,5-dicarboxylic acid, benzophenone-4,4'-dicarboxylic acid, diphenylsulphone-4,4'-dicarboxylic acid, butane tetracarboxylic acid, tricarballylic acid, ethylene, tetracarboxylic acid, pyromellitic acid, benzene-1,2,3,4-tetracarboxylic acid, benzene-1,2,3,5-tetracarboxylic acid, benzene-1,2,4,5-tetracarboxylic acid, naphthalene-1,4,5,8-tetracarboxylic acid and compounds corresponding to the following general formulae:

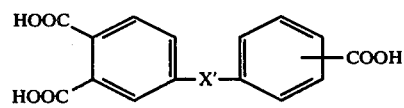

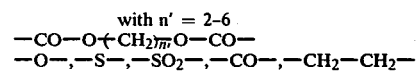

wherein X' represents

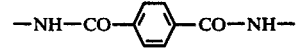
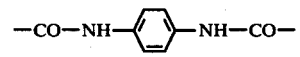

with n' = 2-6
—CO—O$+$CH$_2)_{\overline{n'}}$O—CO—
—O—, —S—, —SO$_2$—, —CO—, —CH$_2$—CH$_2$—

—N=N—, —CH$_2$—, CH$_3$—$\overset{|}{\underset{|}{C}}$—CH$_3$

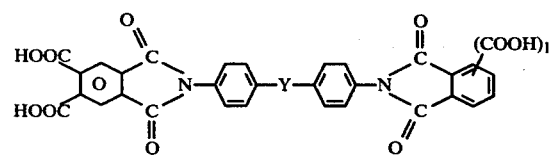

wherein l is 1 or 2
Y represents —O—, —S—, —SO$_2$—,
—CO—, —N=N—, —CH$_2$—CH$_2$—

—CH$_2$—, CH$_3$—$\overset{|}{\underset{|}{C}}$—CH$_3$

The polycarboxylic acid may, as far as is structurally possible, also be used partly or completely as cyclic anhydride compounds, when acid groups can be formed in the course of the reaction according to the present invention. The following are examples of such compounds:

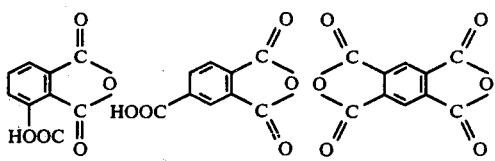

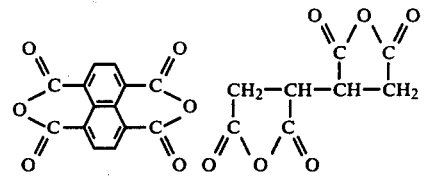

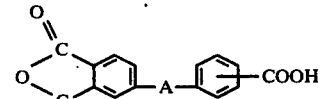

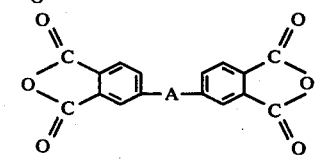

wherein A represents

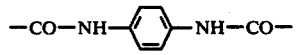
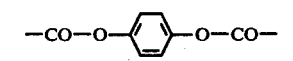

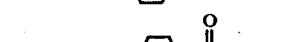

—CO—O$+$CH$_2)_{\overline{n'}}$ O—CO—n'= 2-6
—O—, —S—, —SO$_2$—, —CO—, —CH$_2$—CH$_2$—, —N=N—, —CH$_2$—, CH$_3$—$\overset{|}{\underset{|}{C}}$—CH$_3$

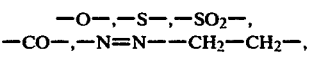

wherein Y represents

—O—, —S—, —SO$_2$—,
—CO—, —N=N—, —CH$_2$—CH$_2$—,

—CH$_2$—, CH$_3$—$\overset{|}{\underset{|}{C}}$—CH$_3$

The polycarboxylic acids may also be oligomeric or polymeric. For example, bis-benzenedicarboxylic acids having the following structural formula may be used:

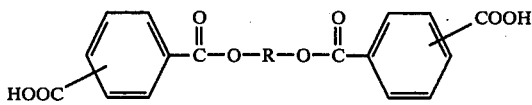

R in that case represents a $C_5-C_{12}$ aromatic group which is at least divalent, a saturated or unsaturated $C_2-C_{20}$ aliphatic group, a $C_5-C_{12}$ cycloaliphatic group which may contain aromatic, cycloaliphatic or heterocyclic ring systems as well as ether, keto, ester or sulphone bridges and which may be substituted with halogen atoms, nitro groups or $C_1-C_{20}$ alkoxy groups.

The following are possible examples of R:

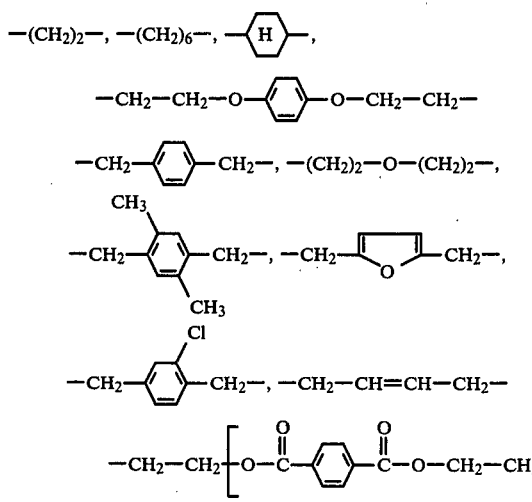

$n'' = 1-7$

In addition, there may also be used oligomeric and/or polymeric acid carboxylic acid esters having the following structural formula:

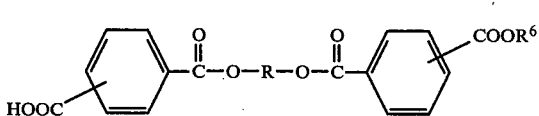

wherein R is defined as above and $R^6$ represents a substituted or unsubstituted $C_1-C_{20}$ aliphatic, $C_6-C_{20}$ aliphatic-aromatic or $C_5-C_{12}$ aromatic group. The following are suitable substituents: halogen atoms nitro, cyano and hydroxyl groups, $C_1-C_{20}$ alkoxy groups and $C_5-C_{12}$ aroxy groups.

The acid groups may also be used in the form of compounds which have an α-amino acid derivative group in addition to at least one carboxylic group. They are preferably compounds corresponding to the following general formula:

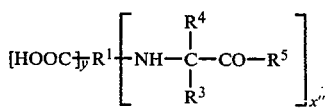

wherein $R^1$, $R^3$, $R^4$ and $R^5$ are defined as above and y and x'', the same or different represent, independently of one another, an integer of from 1 to 3, preferably 1 or 2. These compounds at least partly also take part in the hydantoin ring formation.

The method of preparation of these compounds is known in principle and may be carried out according to U.S. Pat. No. 3,397,253, using the corresponding α-aminocarboxylic acids. The following are examples of suitable α-aminocarboxylic acids for this purpose: 2-, 3- and 4-aminobenzoic acid, 4-chloro-3-aminobenzoic acid, 2- or 4- or 5-aminoisophthalic acid, 1-aminoanthraquinone-2-carboxylic acid, 4-aminoanthraquinone-1-carboxylic acid, 4-aminonaphthalene-1,8-dicarboxylic acid, 2,4- and 3,4-diaminobenzoic acid, aminoacetic acid. These acids may incidentally also be used directly for the process according to the present invention.

The compounds containing acid groups which are used in the process according to the present invention may also be hydroxycarboxylic acids corresponding to the following formula:

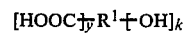

wherein $R^1$ and y are defined as above, k may represent an integer of from 1 to 3, preferably 1 or 2.

Examples of such compounds include hydroxycarboxylic acids such as glycollic acid, lactic acid, mandelic acid, citric acid, tartaric acid, 2-, 3- and 4-hydroxybenzoic acid and hydroxybenzene dicarboxylic acids.

The following compounds containing carboxyl groups are most particularly preferred: isophthalic acid and/or trimellitic acid and/or trimellitic acid anhydride and/or terephthalic acid and their isomers, anilonoisobutyric acid derivatives containing carboxyl groups and the corresponding oligo esters of these acids with minor quantities of ethylene glycol, propylene glycol, glycerol, trimethylolpropane and/or tris-hydroxyethylisocyanurate.

The starting components to be used according to the present invention also include aliphatic, cycloaliphatic, araliphatic, aromatic and heterocyclic polyisocyanates (see Annalen 562, pages 75 to 136), for example, ethylene diisocyanate, tetramethylene-1,4-diisocyanate, hexamethylene-1, 6-diisocyanate, dodecane-1,12-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethylcyclohexane (German Auslegeschrift No. 1 202 785), hexahydrotolylene-2,4- and -2,6-diisocyanate and any mixtures of these isomers, hexahydrophenylene-1, 3- and-/or -1,4-diisocyanate, perhydrodiphenylmethane-2,4'- and/or 4,4'-diisocyanate, phenylene-1,3- and 1,4-diisocyanate, tolyene-2,4- and -2,6-diisocyanate and any mixtures of these isomers, diphenylmethane-2,4'- and-/or 4,4'-diisocyanate, naphthylene-1,5-diisocyanate, triphenylmethane-4,4',4''-triisocyanate, polyphenyl-polymethylenepolyisocyanates which can be obtained by aniline formaldehyde condensation followed by phosgenation and have been described, e.g. in British Pat. Nos. 874 340 and 848 671, perchlorinated aryl-polyisocyanates as described e.g. in German Auslegeschrift No. 1 157 601, polyisocyanates having carbodiimide groups as described in German Pat. No. 1 0 92 007, diisocyanates as described in U.S. Pat. No. 3,492,330, polyisocyanates having allophanate groups as described e.g. in British Pat. No. 994 890, Belgian Pat. No. 761 626 and published Dutch Patent Application No. 7 102 524, and polyisocyanates having isocyanurate groups as described e.g. in German Pat. Nos. 1 022 789, 1 222 067 and 1 027 394 and in German Offenlegungsschrift Nos. 1 929 034 and 2 004 048.

The isocyanurate polyisocyanates used are preferably compounds corresponding to the following general formula:

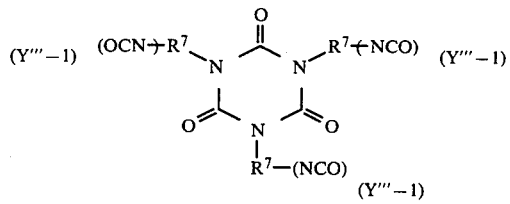

wherein $R^7$ represents the organic group of the isocyanate compound, which has yet to be defined, and $Y'''$ represents an integer of from 1 to 4. Such compounds may, for example, also be prepared according to German Auslegeschrift No. 1 035 362, either separately or in situ from the corresponding organic isocyanates.

Polyisocyanates containing urethane groups, such as those described e.g. in Belgian Pat. No. 752 261 or in U.S. Pat. No. 3,394,164, polyisocyanates containing acylated urea groups according to German Patent No. 1 230 778, polyisocyanates containing biuret groups as described e.g. in German Patent No. 1 101 394, British Pat. No. 889 050 and French Pat. No. 7 017 514, polyisocyanates prepared by telomerisation reactions as described e.g. in Belgian Pat. No. 723 640 and polyisocyanates containing ester groups, such as those mentioned e.g. in British Pat. Nos. 956 474 and 1 072 956, U.S. Pat. No. 3,567,763 and German Patent No. 1 231 688 and reaction products of the above-mentioned isocyanates with acetals according to German Pat. No. 1 072 358 may also be used.

The distillation residues containing isocyanate groups from the commercial production of isocyanates may also be used, optionally as solutions in one or more of the above-mentioned polyisocyanates. Mixtures of the above-mentioned polyisocyanates may also be used.

The monoisocyanates which may be used in minor quantities in addition to polyisocyanates in accordance with the present invention may be aliphatic, cycloaliphatic, aliphatic-aromatic or aromatic compounds containing an isocyanate group in the molecule and optionally substituted by hetero-atoms. Examples include alkylisocyanates such as ethyl, methyl, butyl, dodecyl and stearylisocyanate, aromatic substituted or unsubstituted monoisocyanates such as phenyl, tolyl, isopropyl and nonyl isocyanate, nitro, alkoxy, aroxy, chloro, dichloro, trichloro, tetrachloro, pentachloro, benzyl or bromophenylisocyanate or isocyanato-benzoic acid ester, -phthalic acid ester or -isophthalic acid ester, isocyanatobenzonitrile, cycloaliphatic isocyanates such as cyclohexylisocyanate and unsaturated isocyanates such as allyl, oleyl and cyclohexenylisocyanate.

Isocyanates corresponding to the following general formula (III) are particularly suitable:

$$R^7—(NCO) \quad (III)$$

wherein $R^7$ represents an alkyl group having from 2 to 20 carbon atoms optionally substituted with one or more halogen atoms, with one or more $C_1$-$C_{10}$ alkyl groups and/or with one or more $C_5$-$C_{12}$ aryl groups; an aryl group having from 5 to 12 carbon atoms; a cycloalkyl group having from 5 to 12 carbon atoms; an alkylaryl group having from 6 to 20 carbon atoms or an aryl or cycloalkyl group having from 5 to 12 ring carbon atoms and containing hetero atoms such as N or O or S. $Y'''$ represents an integer of from 1 to 4, preferably from 1 to 3, most preferably 2. Aliphatic groups having from 2 to 12 carbon atoms and aryl groups such as phenyl, tolyl, naphthyl or diphenyl methane and diphenylether groups are particularly preferred.

It is preferred to use commercially readily available mixtures of tolylene diisocyanates, m-phenylene diisocyanates and phosgenated condensates of aniline and formaldehyde having a polyphenylenemethylene structure, and the symmetric compounds, 4,4'-diisocyanatodiphenylmethane, 4,4'-diisocyanatodiphenylether, p-phenylenediisocyanate and 4,4'-diisocyanatodiphenyl dimethylmethane as well as isophorone diisocyanate and hexamethylene diisocyanate.

The isocyanates may be used in the free form or partly or completely in the form of their derivatives which can be obtained by their reaction with the compounds containing reactive hydrogen and which react as isocyanate releasing compounds under the reaction conditions.

The isocyanate releasing compounds used are preferably addition products of lactams, oximes and CH acidic compounds and the carbamic acid esters obtained from aliphatic mono- and polyhydroxyl compounds, for example those corresponding to the following general formulae:

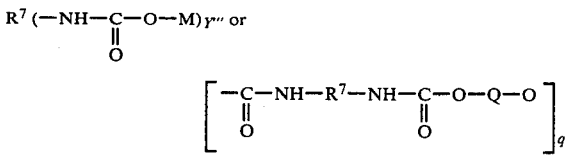

wherein $R^7$ and $Y'''$ are defined as above and M represents the organic group of a monohydroxyl compound and Q represents the organic group of a bis-functional or tris-functional hydroxyl compound, and M and Q, which may be identical or different, preferably represent an aliphatic group having from 1 to 10 carbon atoms, a cycloaliphatic group having from 5 to 12 carbon atoms and/or an aliphatic-aromatic group having from 7 to 12 carbon atoms, which groups may also be substituted with $C_1$-$C_{12}$ alkyl groups and/or $C_5$-$C_{12}$ aryl groups, and q represents an integer of from 1 to 1000, preferably from 1 to 100.

As examples may be mentioned the carbamic acid esters of aliphatic monohydric alcohols such as methanol, ethanol, propanol, isopropanol, butanol, isobutanol, cyclohexanol, allyl alcohol, benzyl alcohol and aliphatic diols or polyols such as ethylene glycol, trimethylolpropane, glycerol and tris-hydroxyethylisocyanate; also the addition products with pyrrolidone-(2), caprolactam, butanone oxime, malonic acid esters, acetoacetic esters and acetophenone.

The isocyanate releasing compounds may be used as such or produced in situ by a reaction with the corresponding reactants.

Instead of the above-mentioned (poly)isocyanates, the analogous (poly)isothiocyanates may be used as starting materials.

The hydroxyalkylethers which are particularly preferred as blocking agents and solvents according to the present invention may be exemplified by compounds corresponding to the following general formula:

$$R^8-OR^9)_p-OH,$$

wherein $R^8$ represents substituted or unsubstituted $C_1-C_{20}$, preferably $C_1-C_8$ aliphatic group, a $C_5-C_{12}$, preferably $C_5-C_8$ cycloaliphatic group, a $C_6-C_{16}$ aliphatic-aromatic group or a $C_5-C_{14}$ aromatic group which may, for example, be substituted with alkoxy or aroxy groups; $R^9$ represents a $C_2-C_{20}$ aliphatic group and p represents an integer of from 1 to 100, preferably from 1 to 4. According to the present invention, it is preferred to use hydroxyalkylethers which contain one hydroxyl group per molecule and in which $R^9$ represents a group having two carbon atoms in the chain which may be substituted, for example, by alkyl groups, e.g. the methyl, isopropyl, cyclohexyl, benzyl, phenyl and methoxyethylethylene glycol- and -propyleneglycol- or -diethyleneglycol- and -dipropyleneglycol-monoethers.

Non-phenolic solvents such as hydrocarbons, halogenated hydrocarbons, alcohols, esters, cyclic esters, ketones, ethers, substituted amides, nitriles, such as xylene, o-dichlorobenzene, benzyl alcohol, phenoxyethanol, acetone phenone, cyclohexanone, propylene carbonate, ε-caprolactam, ethylene glycol butyl ether, diethyleneglycol methyl ether, glycol monomethylether acetate, γ-butyrolactone, ε-caprolactone, benzoic acid alkyl esters, N-methylpyrrolidone, dimethylformamide, dimethylacetamide, benzonitrile, dimethylsulphoxide and mixtures thereof may preferably be used for the process according to the present invention.

Aliphatic and aromatic hydrocarbons such as cyclohexane, xylene, toluene and their commercial mixtures such as Solvesso 100 and solvent naphtha are also suitable as solvents.

Solvents need not necessarily be used, however, and stoichiometric quantities of blocking agents may be used, if desired.

It will be obvious that any polycarboxylic acids and their partial or complete esters and/or anhydrides known to the art are suitable and may be used for the reaction according to the present invention.

Examples of such polycarboxylic acids have already been mentioned above. They may be partly or completely used as esters of the alcohols already mentioned above as blocking agents and/or partly or completely in the form of their anhydrides.

The reaction of the monofunctional or polyfunctional aminocarboxylic acid derivatives mixed or linked with polycarboxylic acids and/or anhydrides and/or oligoesters with the organic isocyanates and other polycarboxylic acids and/or their esters and/or anhydrides to produce the claimed polymers containing hydantoin rings may be carried out in solvents which do not react under the reaction conditions or form only loose addition compounds which continue to react, or it may be carried out in the absence of solvents or in an excess of one of the reactants.

To carry out the process according to the present invention, the reactants, with or without solvent and/or blocking agent, are maintained at a temperature in the range of from −20° to 500° C., preferably from 20° to 400° C., for several minutes to several hours. The progress of the reaction can be followed by the evolution of gas and the IR spectra. The characteristic bands of the polymers according to the invention, particularly for the hydantoin ring and amide structure and if indicated also the imide structure can be clearly substantiated by the IR spectra.

The high molecular weight compounds containing hydantoin rings have solution viscosities ranging from 300 to 500,000 mPa s, preferably from 500 to 200,000 mPa s as determined at 25° C. in 30% solutions in benzyl alcohol, carbitol, γ-butyrolactone.

The quantity of organic isocyanates used is generally 1 equivalent (Val) per equivalent (Val) of the combination according to the present invention of polyfunctional α-aminocarboxylic acid derivatives and acid groups and/or oligoesters, although wide variations of these proportions are possible so that the combination of properties of the polymers according to the present invention can be adapted to every possible practical purpose. It is only suitable, however, to use those molar ratios which result in products which are at least fusible and/or universally soluble in organic, preferably non-phenolic solvents. Preferably at least 0.1 and not more than 49 mol % of polyfunctional α-aminocarboxylic acid derivatives are used for polycondensation. For example, high molecular weight polyhydantoins, hydantoin isocyanates or hydantoin carboxylic acids or their anhydrides are obtained from bis-functional reactants, the end product depending on the stoichiometric proportions used.

The quantity of acid groups provided will therefore be calculated so that in combination with the quantity of monofunctional or polyfunctional α-aminocarboxylic acid derivative, it is equivalent to the total quantity of organic isocyanates present. Their reaction then results in the formation of the aforementioned synthetic materials containing amide groups and optionally imide groups and hydantoin rings.

Both the organic isocyanates and the acid groups may be used in any quantities, preferably in excess and may be reacted at the same time or subsequently with monovalent or polyvalent amines and monohydric or polyhydric alcohols such as ethylene glycol, dipropylene glycol, trimethylolpropane or glycerol, and tris-hydroxyethylisocyanate and/or the combination of cyanuric acid triaryl esters and polyols and/or monobasic or polybasic carboxylic acids and/or their esters and/or anhydrides which may be based, for example, on the above-mentioned polycarboxylic acids, preferably on phthalic acid, isophthalic acid, terephthalic acid, trimellitic acid, pyromellitic acid, butane tetracarboxylic acid, etc., optionally with the addition of other polyisocyanates and optionally also polyisocyanurate polyisocyanates or compounds releasing these substances, and optionally with the addition of auxiliary agents and additives such as ε-caprolactam or ε-caprolactone, to produce linear and/or branched chain synthetic products containing hydantoin rings and, for example, ester, carbamic ester, amide and/or imide groups, which products are characterised by their solubility, excellent temperature resistance, high elasticity and excellent heat shock characteristics.

The condensation products according to the present invention and optionally also their precursors can be mixed equally successfully with polyesters, preferably hydroxyl polyesters, for example, those obtained from maleic acid anhydride phthalic acid anhydride and/or maleic acid, fumaric acid, succinic acid, phthalic acid, isophthalic acid, terephthalic acid, trimellitic acid and/or trimellitic acid anhydride and/or their esters, ethylene glycol, dipropylene glycol, glycerol, trimethylolpropane and/or tris-hydroxyethylisocyanurate and/or a combination of cyanuric acid triaryl esters and polyols; or polyethers, for example those obtained from ethylene oxide and/or bis-(hydroxyphenyl)propane and epichlorohydrin, polyurethanes, polyamides, polyolefins, polyacetals, polyepoxides, polyimides, polyamidoimides, polyester imides, polyester amidoimides, polyiminopolyesters polyimidoisocyanates and they may, if desired, be chemically added and/or incorporated by condensation, or the reaction according to the present invention may be carried out in the presence of these components. The products obtained are in all cases modified polymers which in addition to (thio)-hydantoin rings may contain ether, carbamic acid, carboxylic acid ester, amide, imide, ester amide, ester imide, amido imide and/or ester amido imide groups.

The proportions of these additives may vary within wide limits. They are preferably used in proportions of from 10 to 500% by weight, based on the condensate according to the present invention.

The polymerisation reactions may be further accelerated by means of known catalysts such as bases, e.g. triethylamine, N-methylmorpholine or endoethylenepiperazine, compounds of metals, in particular of iron, lead, zinc, tin, copper, manganese, cobalt or titanium, such as titanium tetrabutylate, titanium aminoalcohol, iron acetyl acetonate, dibutyl tin dilaurate, lead acetate or zinc octoate, and phosphorous compounds such as trialkylphosphine.

It is occasionally advantageous to carry out the reaction in several stages. In such cases, an adduct or condensate, for example, may be prepared in a first stage, optionally using a solvent and/or a blocking agent, and this condensate may then be converted into the possibly high molecular weight condensation product by cyclisation and/or chain lengthening and/or cross-linking at an elevated temperature, optionally with evaporation of the solvent and optionally after the addition of blocking agents. If this condensation product is subsequently used for coating, it may be applied from solvent-free or aqueous systems or as a powder.

Another embodiment of the process according to the present invention claims the use of any isocyanate mixtures, whereby other organic isocyanates may be used, for example, in any partial stages.

Products containing free or masked isocyanate groups may be formed by the process according to the present invention. The degree of polymerisation of the reaction according to the present invention may be controlled by using isocyanate mixtures, for example of polyfunctional and monofunctional isocyanates. Products having a comparable degree of polymerisation but a lower free or masked isocyanate content can be prepared by using calculated proportions of monoisocyanates such as phenylisocyanate, α-naphthylisocyanate, isocyanatobenzoic acid esters or isocyanatoacetic acid esters.

It is in some cases advisable to carry out the reaction under an inert protective gas such as $N_2$ or argon. Lastly, the reaction according to the present invention may be carried out continuously or batchwise or under pressure in an autoclave in order to obtain higher reaction temperatures.

The polyhydantoin compounds obtainable by the process of the present invention have exceptionally high temperature resistance and are readily soluble also in solvents which are free of phenolic solvents.

The synthetic materials modified with the polycondensates according to the present invention have improved temperature characteristics and improved solubility, including their solubility in environmentally harmless solvents. The polymers may be used for the production of temperature-resistant adhesives, fibres, foils and synthetic products. Their properties may be varied within wide limits according to requirement by the addition of fillers, pigments and low molecular weight and high molecular weight components such as polyurethanes, polyesters, polyester imides, polyimides, polyamidoimides, polyamides, polyester amidoimides, polyvinyl acetals, epoxides, polycyanates and silicone resins.

EXAMPLE 1

223.2 g of 3-(N-ethoxycarbonylmethyl)-aminobenzoic acid are dissolved in 300 g of γ-butyrolactone at about 100° C. Starting at a temperature of from 45° C. to 60° C., the solution is mixed with a solution of 250.2 g of 4,4'-diisocyanatodiphenylmethane in 300 g of toluene. The reaction mixture is stirred for about 3 hours at a temperature in the range of from room temperature to 35° C., and 0.5 g of endoethylenepiperazine are then added. The reaction mixture is then slowly heated to 150°–160° C. and at the same time ethanol/toluene/$CO_2$ is discharged. The reaction mixture is then condensed at 200° C. for about 6 hours.

As the viscosity rises, the mixture is diluted with 595 g of γ-butyrolactone.

Viscosity of the product as delivered (30%): 2300 mPa s at 20° C.

The resin after precipitation with methanol has the characteristic bands of hydantoins and carboxylic acid amides in the IR spectrum.

EXAMPLE 2

223.2 g of 3-(N-ethoxycarbonylmethyl)-aminobenzoic acid are dissolved in 300 g of γ-butyrolactone at about 100° C. Starting at a temperature in the range of from 45° to 60° C., 325.3 g of 4,4'-diisocyanato diphenylmethane are added and the reaction mixture is stirred for about 3 hours at from 25° to 35° C.

0.5 g of endoethylene piperazine are then added and ethanol/$CO_2$ are slowly discharged at 150°–160° C. The reaction mixture is then condensed at 200° C. for 5 hours. As the viscosity increases, the mixture is diluted with not more than 200 g of methylbenzoate and after 5 hours at 200° C. that the mixture is diluted with 285 g of benzyl alcohol. After about 2 hours, it is homogenised at about 200° C.

Viscosity of the product as supplied (40%): 7240 mPa s at 20° C.

The approximately 40% oligohydantoin lacquer solution is diluted with 1612 g of cyclohexanone and 1075 g of a polyester of 4.0 mol of dimethylterephthalate, 0.8 mol of trimellitic acid anhydride, 0.9 mol of terephthalic acid, 2.0 mol of tris-(2-hydroxyethyl)-isocyanurate, 0.5 mol of glycerol, 7.0 mol of ethylene glycol, 200 g of Solvesso, 3.0 g of lead acetate and 1.0 g of butyl titanate having a hydroxyl group content of about 4.5% by weight are then added.

The mixture is homogenised for one hour at from 180° to 200° C. and a solution of
16 g of titanium tetrabutylate in
32 g of acetylacetone is then added at from 80° C. to 100° C. and the mixture is stirred for one more hour at from 70° C. to 80° C.

The viscosity of the approximately 40% lacquer solution is about 1720 cP 20° C.

The lacquer film obtained by coating an Erichsen plate with this lacquer solution and stoving it at 250° C. for 15 minutes and at 300° C. for 10 minutes is firmly bonded to its substrate and is characterised by high elasticity and chemical resistance and has a pencil hardness of 5 H. A foil produced from this lacquer by a known method, e.g. on glass, has advantageous mechanical properties, high heat resistance and a softening point of at least 330° C.

EXAMPLE 3

33.2 g of isophthalic acid and
16.6 g of terephthalic acid are mixed with
700 g of acetophenone and the mixture is tempered for about 5 minutes at 170°–180° C.
278.95 g of N,N'-bis-(2-methoxycarbonylpropyl-2)-4,4'-diaminodiphenylmethane are then added at 50° C. and a solution of
250.2 g of 4,4'-diisocyanatodiphenylmethane in
300 g of toluene is finally added with stirring at 30°–50° C.

After about 5 hours at from 30° to 40° C.,
0.5 g of endoethylenepiperazine are added and the mixture is slowly heated through 60°, 80°, 120° and 150° C. to 175° C. while $CO_2$, methanol, toluene are discharged. The mixture is finally condensed for one hour at 190° C., 3 hours at 200° to 205° C. and 2 hours at 205° to 210° C.

As the viscosity rises, the reaction mixture is diluted with
485 g of methyl benzoate and finally stirred for about 1 hour at 170°–150° C.

The lacquer solution at a concentration of about 30% has a viscosity of 65,000 cP 20° C.

The resin after precipitation in methanol has the bands characteristic of hydantoins and amides in the IR spectrum.

EXAMPLE 4

33.2 g of isophthalic acid and
8.3 g of terephthalic acid are mixed with
300 g of γ-butyrolactone,
200 g of ethyl benzoate and
200 g of toluene at room temperature under nitrogen.
298.9 g of N,N'-bis-(methoxycarbonylpropyl-2)-4,4'-diaminodiphenylmethane are then added and, starting at a temperature of 25°–35° C.,
325.3 g of 4,4'-diisocyanatodiphenylmethane are added with stirring. The mixture is stirred for a further 3 hours at about 50° C., 0.5 g of endoethylenepiperazine are added, the mixture is rapidly heated to 150°–160° C. while methanol, toluene, $CO_2$, etc. are discharged, and the reaction mixture is finally condensed at from 200° to 205° C. for about 5 hours. As the viscosity rises, the reaction mixture is diluted with
491 g of benzyl alcohol and finally stirred for about 1 hour at approximately 200° to 205° C.

The oligohydantoin lacquer solution at a concentration of about 40% has a viscosity of 8200 cP 20° C. It is diluted with 1000 g of benzyl alcohol,
500 g of methyl benzoate and
480 g of acetophenone, and
1321 g of a polyester of 4.7 mol of dimethylterephthalate, 1.0 mol of terephthalic acid, 1.9 mol of tris-(2-hydroxyethyl)-isocyanurate, 0.6 mol of trimethylolpropane, 10.0 mol of ethylene glycol, 300 g of Solvesso, 3.0 g of lead acetate and 1.0 g of butyl titanate having a hydroxyl group content of about 4.5% by weight are added. The mixture is homogenised for one hour at from 180° to 200° C., and a solution of
20 g of titanium tetrabutylate in
40 g of acetylacetone is then added at from 80° C. to 100° C., and the mixture is subsequently stirred for one hour at from 70° to 80° C.

The viscosity of the approximately 40% lacquer solution is about 1450 $cP_{20° C}$. When a sample of lacquer painted on a glass plate is concentrated by evaporation and hardened, a clear, elastic foil is obtained. Its IR spectrum has the typical bands for hydantoin, imide, ester, amide and ester amidoimide structures.

EXAMPLE 5

74.8 g of isophthalic acid are mixed with
150 g of γ-butyrolactone and
200 g of toluene under nitrogen.
298.9 g of N,N'-bis-(2-methoxycarbonylpropyl-2)-4,4'-diaminodiphenylmethane are then added, whereupon the mixture is stirred up with
375.4 g of 4,4'-diisocyanatodiphenylmethane at from 35° to 40° C. The mixture is subsequently stirred for about 12 hours at room temperature and a solution of
150 g of 4,4'-diisocyanatodiphenylmethane in
100 g of toluene is then added at approximately 30°–40° C. and the mixture is stirred for one hour at 50° C.
0.5 g of endoethylenepiperazine and
200 g of dimethylterephthalate are added. The mixture is homogenised and rapidly heated through 160° C. to 200° C. while $CO_2$, methanol, toluene, is discharged, optionally under a vacuum of 200 Torr. The mixture is then condensed for about 3 hours at from 200° to 205° C. Starting at 170° C.,
345.8 g of trimellitic acid anhydride are then added and the reaction mixture is homogenised and condensed at 190° C. for one hour, at from 200° to 205° C. for 3 hours and at from 205 to 215° C. for one hour.
518.5 g of dimethylterephthalate,
653.0 g of tris-(2-hydroxyethyl)-isocyanurate,
3.0 g of lead acetate,
1.0 g of butyl titanate and
50 g of xylene are then added at about 170° C. and the mixture is homogenised. The reaction mixture is then condensed for approximately 6 hours at temperatures rising through 170° C. to 200°–220° C. until no distillate forms below 150° C. Finally,
184 g of ethylene glycol and
46 g of glycerol are added at 170° C. and the reaction mixture is again condensed at 200°–220° C. until no more distillate forms below 150° C. The reaction mixture is then condensed at from 210° to 230° C., first at normal pressure and finally at about 200 Torr, until the resin diluted to approximately 50% with γ-butyrolactone has a viscosity of about 12000 $cP_{20° C}$.

The approximately 50% solution of lacquer has a viscosity of 11,300 $cP_{20° C}$.

This lacquer can be applied by a known method to form a film, e.g. on glass. Foils produced in this manner have advantageous mechanical properties, high heat resistance with a softening point above 330° C., high shrinkage resistance and excellent electrical insulating properties. Their IR spectrum shows the typical bands of the hydantoin, amide, imide, ester and isocyanurate structures contained in them.

EXAMPLE 6

8.3 g of isophthalic acid and
76.8 g of trimellitic acid anhydride are dispersed with
200.0 g of toluene at room temperature under nitrogen.
298.9 g of N,N'-bis-(2-methoxycarbonylpropyl-2)-4,4'-diaminodiphenylmethane are then added and, starting at a temperature in the region of from 35° to 45° C., the mixture is mixed with a solution of
375.4 g of 4,4'-diisocyanatodiphenylmethane in
100.0 g of toluene. After about 6 hours, a solution of
104.5 g of a mixture of 80 parts of 2,4-tolylene diisocyanate and 20 parts of 2,6-tolylene diisocyanate in
100.0 g of toluene is added at from 40° to 45° C. and the resulting mixture is homogenised for one hour at 50° C. and stirred up at 50° C. with
345.8 g of trimellitic acid anhydride and
1.0 g of endoethylenepiperazine and finally, after 0.5 hours at 50° C., with
718.5 g of dimethyl terephthalate and
50.0 g of xylene.

The mixture is then heated in stages in the course of formation of the distillate and evolution of gas, the temperature being raised through 100° C. to 150°–160° C. and then, optionally under a vacuum of up to 200 Torr, to 200° C., and the mixture is then tempered for about 5 hours at from 205° to 210° C.
184.0 g of ethylene glycol,
92.0 g of glycerol,
522.5 g of tris-(2-hydroxyethyl)-isocyanurate,
1.5 g of butyl titanate,
4.0 g of lead acetate and
50.0 g of xylene are then each thoroughly stirred up with the reaction mixture at 160° C. and the mixture is condensed for about 7 hours at temperatures passing through 170°–175° C. to 210°–220° C. until no more distillate forms below 150° C. Condensation is finally carried out at about 210° to 230° C., optionally under a vacuum of up to 200 Torr, until a resin solution diluted to 50% with diethylene glycol monomethyl ether remains a clear solution and has a viscosity of at least 10,500 cP$_{20°}$ C. The solid content of the undiluted, brownish red, clear, brittle resin is 96.7% by weight, as determined according to DIN. The IR spectrum of the 100% concentrate shows the typical absorptions for hydantoins, esters, amides, and imides.

The approximately 97% by weight resin has a viscosity of about 4700 cP at 150° C. It can be used directly in known extrusion plants for coating cables. Tempering at from 250° to 270° C. renders the cable sheaths refractory (330° C.), scratch resistant and resistant to chemicals but they remain highly elastic and have excellent electrical insulating properties.

EXAMPLE 7

8.3 g of isophthalic acid and
76.8 g of trimellitic acid anhydride and, at temperatures starting from 30° C., also
375.3 g of 4,4'-diisocyanatodiphenylmethane are added under nitrogen to
800.0 g of a solution of N,N'-bis-(2-methoxycarbonylpropyl-2)-4,4'-diaminodiphenylmethane in a mixture of γ-butyrolactone (40%) and toluene (60%) (N-content 2.63%). The mixture is homogenised for at least one hour at from 30° to 45° C.,
0.5 g of triethylenediamine are then added, and most of the toluene is then discharged with heating to about 180° C. After approximately 30 minutes at 180° C.,
150.0 g of 4,4'-diisocyanatodiphenylmethane,
345.8 g of trimellitic acid anhydride and
200.0 g of acetophenone are introduced at about 120° C. and the mixture is maintained at 200° C. for about 4 hours.
175.0 g of dimethyl terephthalate,
271.2 g of tris-(2-hydroxyethyl)-isocyanurate,
1.0 g of butyl titanate and 3.0 g of lead acetate are finally added at from 170° to 180° C., followed, after about 4 hours at 200° C., by
370.0 g of ethylene glycol, and the resulting mixture is then heated for approximately a further 2 hours to temperatures of up to 220° C.
1665.0 g of a brittle resin having a solid content of about 85.6% and a viscosity of 26,000 cP as determined in a 50% butyrolactone solution at 20° C. are obtained.

The product obtained after heating to 230°–250° C. is a polyhydantoin which is infusible up to 400° C. and which shows the typical absorption bands for hydantoins, esters, amides and imides in the IR spectrum.

EXAMPLE 8

525.4 g of 4,4'-diisocyanatodiphenylmethane are introduced with a suspension of about
299.0 g of N,N'-bis-(2-methoxycarbonylpropyl-2)-4,4'-diaminodiphenylmethane,
200.0 g of γ-butyrolactone,
300.0 g of toluene (the N-content of the bis-glycine ester dissolved in γ-butyrolactone/toluene is 2.6%),
8.3 g of isophthalic acid and
57.6 g of trimellitic acid anhydride at from 30° to 45° C. under nitrogen. A further
100.0 g of toluene are added and the mixture is stirred at room temperature for approximately 12 hours.
0.5 g of triethylenediamine,
345.8 g of trimellitic acid anhydride and
200.0 g of acetophenone are then stirred in at 50° C. and the reaction mixture is heated to about 200° C. while toluene is discharged. After approximately 6 hours at 200° C.,
175.0 g dimethylterephthalate are added at about 180° C.,
180.6 g of tris-(2-hydroxyethyl)-isocyanurate at about 150° C., and
387.0 g of a mixture of
178.0 g of trisphenoxytriazine and
350.0 g of ethylene glycol from which about 140.0 g of phenol have previously been removed by heating to about 150°–170° C. for approximately 2 hours under a vacuum of 200 Torr, and
0.5 g of butyl titanate are also added.

After a further 6 hours at from 200° to 220° C., 1700.0 g of a brownish red, brittle resin having a solid content of 92.5% (measured according to DIN in 3 hours at 200° C.) and a viscosity of 29,000 mPa s determined in a 50% γ-butyrolactone solution at 20° C. are obtained. When a sample of the resin melted on a glass plate is heated to 230° C. for one hour, an elastic foil which does not cross-link and has a high temperature resistance (softening temperature above 350° C.) is obtained. It shows the typical IR absorptions for hydantoins, imides, ester amides and isocyanurates.

EXAMPLE 9

(a) A total of
310.7 g of dimethylterephthalate and, in place of tris-(2-hydroxyethyl)-isocyanurate, a total of
336.0 g of a mixture of
356.0 g of tris-phenoxytriazine and
350.0 g of ethylene glycol, from which about 370.0 g of phenol have previously been removed by heating to 150°–170° C. for approximately 2 hours at about 200 Torr
are reacted together under the conditions indicated in Example 8, the quantities of the other reactants being unchanged.

Approximately 1875.0 g of a brownish red, solid resin having a solid content of 89.6% and a viscosity of 45,800 mPa s determined in a 50% butyrolactone solution are obtained.

(b) Using conditions analogous to those indicated in Example 9 a,
406.4 g of terephthalic acid bis-glycol ester are used instead of the dimethyl terephthalate while the other quantities of reactants are left unchanged. The reaction is carried out as described in Example 8, and 1804.0 g of a brittle, brownish red resin are obtained. The solid content in the resin is 91.5% and the viscosity of a 50% by weight solution in γ-butyrolactone is 52,400 mPa s at 20° C.

EXAMPLE 10

A suspension of approximately
299.0 g of N,N'-bis-(2-methoxycarbonylpropyl-2)-4,4'-diaminodiphenylmethane in
200.0 g of γ-butyrolactone,
300.0 g of toluene (total nitrogen content 2.6%),
8.3 g of isophthalic acid and
57.6 g of trimellitic acid anhydride is mixed with a total of
525.4 g of 4,4'-diisocyanatodiphenylmethane under nitrogen at temperatures of up to 45° C. and stirred at room temperatures for about 12 hours after the addition of
100.0 g of toluene.
345.8 g of trimellitic acid anhydride are stirred in at approximately 50° C.
0.5 g of triethylenediamine and
200.0 g of dimethylterephthalate are added and the reaction mixture is maintained at temperatures of up to 200° C. for approximately 6 hours.
518.5 g of dimethyl terephthalate are added at from 170° to 180° C., and
522.5 g of tris-(2-hydroxyethyl)-isocyanurate,
1.0 g of lead acetate and
1.0 g of butyl titanate are added at approximately 150° C. The reaction mixture is slowly heated to 200°–220° C. while the condensation products are discharged. After approximately 6 hours at from 200° to 220° C.,
92.0 g of glycerol and
186.0 g of ethylene glycol are added at about 180° C. and the mixture is again heated to 220° C. for approximately 2 hours. 2530.0 g of brittle, reddish brown resin having a solid content of 85% and a viscosity of 3700 mPa s as determined in a 50% γ-butyrolactone solution at 20° C. are obtained. A sample of resin stoved on a strip of sheet metal at approximately 250° C. for 0.5 hours shows the typical absorption bands for hydantoins, esters, amides, imides, etc. in the IR spectrum.

EXAMPLE 11

8.3 g of isophthalic acid and
57.6 g of trimellitic acid anhydride are added at 30°–60° C. to
750.0 g of a solution of N,N'-bis-(2-methoxycarbonylpropyl-2)-4,4'-diaminodiphenylmethane (40%) in a mixture of γ-butyrolactone (20%) and toluene (40%), and
350.3 g of 4,4'-diisocyanatodiphenylmethane are then added at from 30° to 80° C.
150.2 g of 4,4'-diaminodiphenylmethane are added after 2 hours at 60° C. After the addition of
1.0 g of triethylenediamine,
200.0 g of dimethylterephthalate and
345.0 g of trimellitic acid anhydride, the reaction mixture is heated to 200° C. and, after a period of at least 4 and not more than 6 hours at 200° C. and then at from 180° to 150° C.,
285.0 g of dimethylterephthalate,
653.0 g of tris-(2-hydroxyethyl)-isocyanurate, catalytic quantities of lead acetate and butyl titanate and
380.0 g of hydroxypolyester of 1.6 mol of dimethyl terephthalate, 0.8 mol of glycerol and 1.20 mol of glycol having a hydroxyl group content of approximately 6.0% by weight are added. After renewed condensation for a period of from 4 to not more than 6 hours at from 200° to 220° C., 2570.0 g of a clear, reddish brown resin which is brittle at room temperature are obtained. Its solid content is approximately 90% by weight and its viscosity as determined in a 50% γ-butyrolactone solution at 20° C. is about 22,000 mPa s. A sample of resin boiled in methanol has the typical absorption for hydantoins, imides, esters and amides in the IR spectrum.

EXAMPLE 12

Using the starting materials mentioned in Example 11 and the reaction conditions mentioned there,
186.0 g of ethylene glycol are added during the 180° to 150° C. phase. After condensation for at least 6 to 8 hours at from 200° to 220° C., a total of 2568 g of a reddish brown resin which is clear and brittle at room temperature is obtained while the decomposition products such as methanol, water, CO₂ and a part of the additives distil off. This resin has a solid content of 91% by weight as measured according to DIN and a viscosity of 55,000 mPa s as determined in a 50% by weight solution of γ-butyrolactone at 20° C. The IR spectrum of a sample worked up as described in Example 11 is identical to the material isolated in that Example.

EXAMPLE 13

A total of
350.3 g of 4,4'-diisocyanatodiphenylmethane is added portionwise under nitrogen to a suspension of
299.0 g of N,N'-bis-(2-methoxycarbonylpropyl-2)-4,4'-diaminodiphenylmethane,
150.0 g of γ-butyrolactone,
300.0 g of toluene,
8.3 g of isophthalic acid and
57.6 g of trimellitic acid anhydride at temperatures starting from 25° C. and going up to a maximum of 45° C. The reaction mixture is subsequently stirred for about 4 hours at from 40° to 45° C. and is finally mixed with 345.8 g of trimellitic acid anhydride at 60° C. After one more hour at 60° C.,
1.0 g of triethylenediamine,
120.0 g of 4,4'-diaminodiphenylmethane,
250.0 g of dimethylterephthalate and
50.0 of γ-butyrolactone are added at from 60° to 70° C.

The reaction mixture is heated to 200° C. and then condensed for from 4 to 6 hours at from 200° to 230° C.
518.2 g of dimethylterephthalate are subsequently added at 180° C. and 653.0 g of tris-(2-hydroxyethyl)-isocyanurate, catalytic quantities of lead acetate and butyl titanate,
46.0 g of glycerol and
186.0 g of ethyleneglycol are added at from 140° C. to 150° C. and condensation is carried out for 6 to 8 hours at from 200° to 230° C. with removal of the condensation products and additives by distillation.

2694.0 g of a clear, brittle, brownish red resin having a solid content of 90.3% by weight (according to DIN) and a viscosity of 22,000 mPa s as determined in a 50% by weight γ-butyrolactone solution at 20° C. are obtained.

A sample of the polymer stoved on polished metal plates shows the typical bands for hydantoin, ester, amide, imide and isocyanurate groups in the IR spectrum taken by reflection measurement.

EXAMPLE 14

350.3 g of 4,4'-diisocyanatodiphenyilmethane are introduced under nitrogen at temperatures starting from 25° C. and up to 60° C. into a suspension of
299 g of N,N'-bis-(2-methoxycarbonylpropyl-2)-4,4'-diaminodiphenylmethane,
150 g of γ-butyrolactone,
300 g of toluene,
8.3 g of isophthalic acid and
57.6 g of trimellitic acid anhydride.
345.8 g of trimellitic acid anhydride are added after one hour's stirring at 60° C.
1.0 g of triethylenediamine is then introduced and the reaction mixture is stirred for about one hour at 60° C. After the addition of
120 g of 4,4'-diaminodiphenylmethane,
200 g of dimethylterephthalate and
50 g of γ-butyrolactene, the reaction mixture is heated to 200°-230° C. with removal of the toluene by distillation, and condensed for from 4 to 6 hours.
382 g of dimethylterephthalate are then stirred in at 180° C. and
734.1 g of tris-(2-hydroxyethyl)-isocyanurate,
275 g of a polyester of 1.0 mol of terephthalic acid, 0.38 mol of glycerol and 0.72 mol of glycol having a hydroxyl group content of about 6.0% by weight and catalytic quantities of lead acetate and butyl titanate at 150° C. After a final condensation for from 4 to 6 hours at from 200° to 220° C., 2724 g of a clear, pale reddish brown, brittle, solid resin having a resin content of 90.3% (according to DIN) and a viscosity of 22 070 mPa s as determined in a 50% solution of γ-butyrolactone at 20° C. are obtained.

A product crushed to a particle size of <1 μm in a ball mill is applied to Erichsen plates in an electrostatic power coating installation and subsequently stoved for 30 minutes at 200° C. and 30 minutes at 250° C. to produce a homogenous, clear, light brown film which has great surface hardness, high elasticity and chemical resistance and a softening temperature >330° C.

EXAMPLE 15

299 g of N,N'-bis-(2-methoxycarbonylpropyl-2)-4,4'-diaminodiphenylmethane,
8.3 of isophthalic acid and
57.6 g of trimellitic acid anhydride are stirred up with
150 g of γ-butyrolactone and
300 g of toluene at room temperature, and
213 g of 4,4'-diisocyanatodiphenylmethane are then added at from 25° to 45° C. under nitrogen, and the mixture is subsequently stirred for one hour at 45° C. A further
345.8 g of trimellitic acid anhydride and
288 g of 4,4'-diisocyanatodiphenylmethane are then added at temperatures of from 45° C. to 60° C. A further
200 g of dimethylterephthalate and
1.0 g of triethylenediamine are then added and the mixture is stirred for one hour at 60° C. under nitrogen.

The reaction mixture is finally heated to 200°-220° C. for from 4 to 6 hours while the toluene and condensation products are discharged.
518.2 g of dimethylterephthalic are added, starting at about 180° C., and
653 g of tris-(2-hydroxyethyl)-isocyanurate,
180 g of ethylene glycol,
46 g of glycerol and catalytic quantities of lead acetate and butyl titanate are added, starting at about 150° C., and the mixture is again condensed for 4 to 6 hours at from 200° to 220° C.

2488 g of a brittle, brownish red solid resin having a resin content of 90.6% (according to DIN) and a viscosity of 8700 mPa s, as measured in a 50% solution in γ-butyrolactone at 20° C., are finally obtained.

The resin is converted into a 15% solution in methylene chloride, cast to form a foil in a suitable foil casting machine, and stretched to a total thickness of not more than 10 μm at a temperature of from 250° to 270° C. The clear, almost colourless foil has a high tear resistance and good deep drawing properties, a resoftening temperature above 350° C., a heat distortion temperature of at least 300° C., good chemical resistance and elasticity and excellent electrical insulating properties.

EXAMPLE 16

A total of
500.5 g of 4,4'-diisocyanatodiphenylmethane is added under nitrogen at temperatures starting from 25° C. and reaching 100° C. to a reaction mixture of
299 g of N,N'-bis-(2-methoxycarbonylpropyl-2)-4,4'-diaminophenylmethane in
150 g of γ-butyrolactone,
300 g of toluene,
8.3 g of isophthalic acid and
57.6 g of trimellitic acid anhydride;
1.0 g of triethylenediamine,
200 g of dimethylterephthalate and
345.8 g of trimellitic acid anhydride are then added at about 80° C. The reaction mixture is then stirred for one hour at 100° C. and one hour at 125° C., and heated to 200° C. within 2 hours while the toluene and condensate are discharged. The remaining reaction mixture is then condensed for about 4 hours at from 200° to 220° C. and cooled to approximately 180° C.

285 g of dimethylterephthalate,
734 g of tris-(2-hydroxyethyl)-isocyanurate,
380 g of a terephthalic acid polyester of 1.0 mol of terephthalic acid, 0.38 mol of glycerol and 0.72 mol of glycol containing approximately 6.0% by weight of hydroxyl groups and catalytic quantities of lead acetate and butyl titanate are then introduced one after another and stirred homogeneously into the reaction mixture. After condensation for one hour at 170° C., 2 hours at 200° C. and 2 hours at 220° C.,
100 g of ethylene glycol are added at approximately 180° C. and the reaction mixture is heated for a further 2 hours at 220° C. 2460 g of a brittle, brownish red resin having a solid content of 91.3% by weight and a viscosity of 10,300 mPa s as determined in a 50% solution of γ-butyrolactone at 20° C. and a viscosity of 8700 mPa s as determined in a 50% solution of diethylene glycol monoethyl ether at 20° C. are obtained. The solid resin can be worked up in an extruder to form clear, brownish red moulded articles having softening temperatures above 350° C. and dimensional stabilities under heat above 300° C.

EXAMPLE 17

582.5 g of dimethylterephthalate,
92.1 g of glycerol,
86.5 g of trimellitic acid anhydride,
2.0 g of lead acetate and
60 g of xylene are mixed under nitrogen and condensed at from 200° to 210° C. until methanol distillation is completed. The solvent-free reaction mixture is diluted with 50 g of γ-butylrolactone,
100 g of ethylbenzoate and
150 g of toluene
298.9 g of N,N'-bis-(2-methoxycarbonylpropyl-2)-4,4'-diaminodiphenylmethane are added at 30° C. A solution of
500.4 g of 4,4'-diisocyanatodiphenylmethane in
200 g of toluene are then added at from 30° to 45° C. The mixture is stirred at room temperature for approximately 7 hours and
307.4 g of trimellitic acid anhydride,
116.3 g of terephthalic acid and
1.1 g of endoethylenepiperazine are then added.

The reaction mixture is heated to 200° C. within one hour and condensed at from 210° to 220° C. for 5 hours. After evolution of CO$_2$ and formation of the condensate,
391.9 g of tris-(2-hydroxyethyl)-isocyanurate,
2.0 g of lead acetate,
1.0 g of butyl titanate and
70 g xylene are added, starting at 170° C., and the reaction mixture is then condensed at from 200° to 220° C. for about 6 hours until distillation is completed. Starting at 190° C.,
186.0 g of glycol and
46.0 g of glycerol are added and the reaction mixture is condensed for about 3 hours at from 210° to 220° C. or until no more distillate is obtained below 150° C. Finally, the reaction mixture is again condensed at from 210° to 230° C., initially at normal pressure and finally under a vacuum of up to a maximum of 200 Torr.

The resulting brownish red, clear, brittle resin has a solid content of 91.7% by weight as determined according to DIN, a melt viscosity of 1950 cP at 150° C. and a solution viscosity of at least 17,000 cP at 20° C. in a 50% by weight solution in benzyl alcohol.

The resin, which in the hardened state has the typical IR bands for hydantoins, urethanes, amides, imides, esters and isocyanurates, can be directly processed into shaped products which have great surface hardness, good chemical resistance, excellent heat resistance (above 380° C.) and outstanding electrical properties.

EXAMPLE 18

732.1 g of dimethylterephthalate,
57.6 g of trimellitic acid anhydride,
8.3 g of isophthalic acid,
211.6 g of tris-(2-hydroxyethyl)-isocyanurate,
1.5 g of lead acetate and
70 g of xylene are mixed under nitrogen and condensed at from 200° to 210° C. until the formation of distillate is completed. The reaction mixture is diluted with
150 g of acetophenone and
100 g of toluene.
298.9 g of N,N'-bis-(2-methoxycarbonylpropyl-2)-4,4'-diaminodiphenylmethane are then added, starting at 30° C., and a mixture of
121.9 g of tolylene diisocyanate (isomeric mixture of 2,4:2,6=80:20) and
147.1 g of 1,5-diisocyanatonaphthalene in
150 g of toluene as well as
0.7 g of endoethylenepiperazine are added at from 35° to 40° C., and the reaction mixture is stirred for about 9 hours at from 30° to 35° C.
96.1 g of trimellitic acid anhydride and
0.6 g of endoethylenepiperazine are then added at 50° C. and the reaction mixture is heated to raise the temperature in stages through 100° C. and 120° C. to 170° C. within 2 hours. The mixture is then tempered for one hour at 190° C., 3 hours at 205° to 210° C. and 2 hours at 210° to 215° C. until evolution of CO$_2$ and formation of distillate are completed.
83.1 g of terephthalic acid,
326.6 g of trimellitic acid anhydride and, portionwise, a total of
168.5 g of 4,4'-diaminodiphenylmethane are subsequently added, starting at 170° C.
522.5 g of tris-(2-hydroxyethyl)-isocyanurate,
124.0 g of glycol,
50.0 g of glycerol,
1.5 g of lead acetate,
1.0 g of butyl titanate and
70 g of xylene are then added and the reaction mixture is heated from 170° C. to 200° C. and condensed for about 7 hours, first at 200° to 220° C. and then at 220° to 230° C. until the formation of distillate is completed. The resulting reddish brown, brittle casting resin has a solid content of about 91.3% by weight and a viscosity of at least 21,000 cP at 20° C. in a 50% by weight solution in benzyl alcohol.

The resin solution adjusted to about 20% by weight using propylene carbonate is cast in a foil casting machine to form a foil which is hardened at 270° to 280° C. in approximately 30 minutes and processed with appropriate copper foils to produce flexible printed circuits. The required electric contact points can be directly soldered to the highly heat resistant, shrink resistant foils.

The IR spectrum of the foil shows the typical bands for hydantoins, amides, esters, imides and isocyanurates.

EXAMPLE 19

325.3 g of 4,4'-diisocyanatodiphenylmethane and
298.9 g of N,N'-bis-(2-methoxycarbonylpropyl-2)-4,4'-diaminodiphenylmethane are mixed with
400 g of acetophenone and 200 g of toluene at room temperature under nitrogen.
41.5 g of isophthalic acid and
0.5 g of endoethylenepiperazine are added at from 35° to 40° C. and the reaction mixture is stirred for 12 hours at from 35° to 40° C.
147.1 g of 1,5-diisocyanatonaphthalene and
0.7 g of endoethylenepiperazine are then added at from 30° to 40° C. and the mixture is stirred for one hour at 50° C. with the addition of
384.2 g of trimellitic acid anhydride and
194 g of dimethylterephthalate. It is then heated in stages over a period of about 3 hours through 100° C., 120° C. and 170° C. to 190° C. and condensed for 3 hours at from 205° to 210° C. until evolution of $CO_2$ and formation of distillate are completed.
972.5 g of a condensate of 1 mol of tris-(-hydroxyethyl)-isocyanurate and 3 mol of dimethylterephthalate,
33.2 g of terephthalic acid,
391.9 g of tris-(2-hydroxyethyl)-isocyanurate,
156.6 g of glycerol,
3.0 g of lead acetate,
1.5 g of butyl titanate and
70 g of xylene are then added at 170° C. and the reaction mixture is heated from 170° C. to 200° C., condensed at from 220° C. for approximately 6 hours and finally condensed at from 220° to 230° C. until evolution of $CO_2$ and formation of condensate are completed and until the reaction product has a melt viscosity of approximately 2000 cP at 160° C. and a DIN solid content of at least 91% by weight.

The 50% by weight solution of the casting resin in benzyl alcohol has a viscosity of at least 27,500 cP at 20° C.

The IR spectrum of the solution shows the typical absorption bands for hydantoin, amide, imide, ester and isocyanurate structures.

A glass silk fabric impregnated with this lacquor solution is dried for 10 minutes at 200° C. and a highly heat resistant, solvent resistant and abrasion resistant coating having excellent electrical insulating properties is obtained after 15 minutes at 300° C.

EXAMPLE 20

210.2 g of 1,5-diisocyanatonaphthalene,
8.3 g of isophthalic acid and
38.4 g of trimellitic acid anhydride are mixed with
800 g of acetophenone and
200 g of toluene at room temperature under nitrogen.
296.9 g of N,N'-bis-(2-methoxycarbonylpropyl-2)-4,4'-diaminodiphenylether are then added at from 30° to 45° C. The mixture is stirred for 3 hours at from 30° to 35° C. and
0.7 g of endoethylenepiperazine are added. The mixture is then heated through 150°/160° C. to 200° C. within one hour and condensed for a total of 6 hours at from 200° to 205° C. and finally diluted with a total of
340 g of ethyl benzoate to an approximately 30% by weight solution having a viscosity of approximately 87,300 cP at 20° C.

The resin solution diluted with benzyl alcohol/toluene (1:1) to approximately 7% by weight is atomised into a methanol phase by means of an airless spray device and precipitated as a fine powder.

This powder can be cast to form foils by a process analogous to that described in Example 18, for example from a methylene chloride solution, and in this case it can even be worked up with copper foils without tempering after lamination to produce flexible printed circuits having a highly heat resistant, flexible, solvent resistant and outstandingly electrically insulating support material.

The IR spectrum of the material of the foil contains the typical absorption bands for hydantoin, amide and imide structures.

Lastly, the resin solution cast on glass surfaces, superficially dried and chilled under water, can be worked up into permeable foils in which the porosity can be controlled. Such membranes, which are suitable for the removal of salt from water by the process of "reverse osmosis", can achieve an up to 99.9% by weight removal of salt from water.

We claim:

1. A process for the production of compounds containing (thio)hydantoin groups comprising reacting a glycine ester with a polyiso(thio)cyanate or iso(thio)cyanurate polyisocyanate at a temperature of from $-10°$ to 500° C. in the presence of an acid having at least one free carboxylic acid group in a solventless system or in the presence of non-phenolic solvent.

2. A process as claimed in claim 1 wherein the acid compound is of the formula

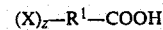

wherein
$R^1$ is a $z+1$-valent aliphatic, cycloaliphatic, aliphaticaromatic, heterocyclic or aromatic group, z is an integer of from 1 to 4 and X is a carboxylic, glycine ester, hydroxyl, amino, carboxylic ester or cyclic anhydride group.

3. A process as claimed in claim 2, wherein $R^1$ is an aliphatic group having from 1 to 20 carbon atoms, cycloaliphatic group having from 5 to 12 carbon atoms, aliphaticaromatic group having from 6 to 20 carbon atoms or aromatic group having from 5 to 12 carbon atoms or an aryl or cycloalkyl group having from 5 to 12 ring carbon atoms and containing heteroatoms such as N or O or S in the ring, and z represents an integer of 1 or 2.

4. A process as claimed in claim 1 wherein the acid is at least one compound selected from the group consisting of isophthalic acid, trimellitic acid, trimellitic acid anhydride, terephthalic acid and their isomers, anilinoisobutyric acid, and the corresponding oligo esters of the preceeding acids prepared with minor quantities of ethylene glycol, propylene glycol, glycerol, trimethylolpropane or tris-hydroxyethylisocyanurate.

5. A process as claimed in claim 1, wherein the acid can be formed during the reaction from partly or completely cyclic anhydride compounds.

6. A process as claimed in claim 1, wherein the acid is of the following general formula

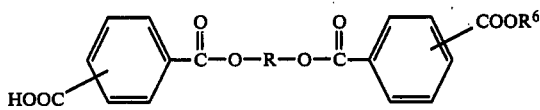

wherein
- R represents a $C_5$–$C_{12}$ aromatic group which is at least divalent, a saturated or unsaturated $C_2$–$C_{20}$ aliphatic group, a $C_5$–$C_{12}$ cycloaliphatic group which may contain aromatic, cycloaliphatic or heterocyclic ring systems as well as ether, keto, ester or sulphone bridges and which may be substituted with halogen atoms, nitro groups or $C_1$–$C_{20}$ alkoxy groups, and
- $R^6$ represents hydrogen or $C_1$–$C_{20}$ aliphatic, $C_6$–$C_{20}$ aliphatic-aromatic or $C_5$–$C_{12}$ aromatic group which all may be substituted with halogen atoms, nitro, cyano and 7. A process as claimed in claim 6, wherein R represents

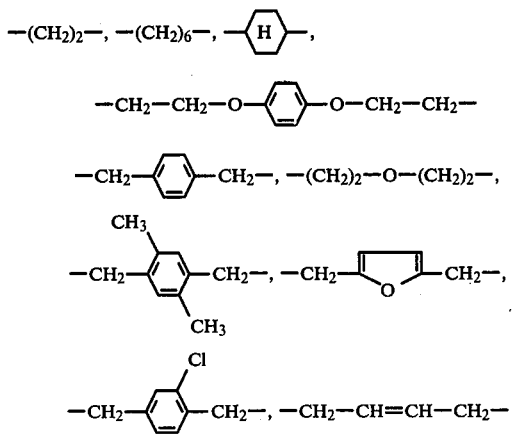

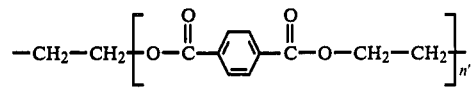

$n' = 1$–$7$

8. A process as claimed in claim 1, wherein the acid is of the general formula

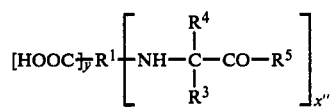

wherein
- $R^3$ and $R^4$ the same or different, represent hydrogen, an alkyl group having from 1 to 20 carbon atoms, an aryl group having from 5 to 12 carbon atoms or an aralkyl group having from 6 to 20 carbon atoms or may be linked in an alkyl ring with $C_2$–$C_{20}$; hydroxylalkyl group, an amino group, a $C_1$–$C_{20}$ alkylamino group, a $C_1$–$C_{20}$ dialkylamino group, a $C_1$–$C_{20}$ alkoxy group or a $C_5$–$C_{12}$ aroxy group and y and x'' the same or different, an integer of from 1 to 3.

9. A process as claimed in claim 1, wherein as non-phenolic solvents hydrocarbons, halogenated hydrocarbons, alcohols, esters, cyclic esters, ketones, ethers, substituted amides nitriles or hydroxyalkylethers are used.

10. A process as claimed in claim 9, wherein as solvent at least one member of the group consisting of xylene, o-dichlorobenzene, benzyl alcohol, phenoxyethanol, acetophenone, cyclohexanone, propylene carbonate, ε-caprolactam, ethylene glycol butyl ether, diethyleneglycol methyl ether, glycol monomethylether acetate, γ-butyrolactone, cyclohexane ε-caprolactone, benzoic acid alkyl ester, N-methylpyrrolidone, dimethylformamide, dimethylacetamide, benzonitrile, dimethylsulphoxide, toluene and their commercial mixtures are used.

11. Heat resistant coating materials, foils, adhesives and shaped products obtained by using compounds produced according to claim 1.

* * * * *